United States Patent [19]

Abu-Shumays et al.

[11] Patent Number: 4,919,468

[45] Date of Patent: Apr. 24, 1990

[54] DUAL SUN VISORS

[76] Inventors: Ibrahim K. Abu-Shumays; Mary D. Abu-Shumays, both of 1248 Varner Rd., Pittsburgh, Pa. 15227

[21] Appl. No.: 387,784

[22] Filed: Aug. 1, 1989

Related U.S. Application Data

[63] Continuation-in-part of Ser. No. 158,846, Feb. 22, 1988, abandoned.

[51] Int. Cl.⁵ .............................................. B60J 3/02
[52] U.S. Cl. ................................................... 296/97.4
[58] Field of Search ................... 296/97.4, 97.1, 97.13, 296/97.11, 97.2

[56] References Cited

U.S. PATENT DOCUMENTS

| | | | |
|---|---|---|---|
| 2,279,011 | 4/1942 | Nicholson | 296/97.4 X |
| 2,607,906 | 8/1952 | Sang | 296/97.4 |
| 2,698,728 | 1/1955 | Hedeen | 296/97.13 X |
| 2,917,186 | 12/1959 | Beets | 296/97.13 X |
| 2,976,759 | 3/1961 | Bleuer | 296/97.2 X |
| 3,017,217 | 1/1962 | Keating | 296/97.13 |
| 3,226,151 | 12/1965 | Reuther | 296/97.4 |
| 4,363,513 | 12/1982 | Sahar | 296/140 |
| 4,377,020 | 3/1983 | Vigo | 296/97.13 X |
| 4,679,843 | 7/1987 | Spykerman | 296/97.9 X |
| 4,762,359 | 8/1988 | Boerema et al. | 296/97.11 |

Primary Examiner—Margaret A. Focarino
Assistant Examiner—Joseph D. Pape

[57] ABSTRACT

A pair of sun visors for covering parts of both a front windshield and a front side window of an automobile. The visors may be attached to the automobile with cylindrical rods associated with bracket units, several different types of hinge mechanisms or a clamp and plate arrangement. The visors may also be actuated by electric motors for rotation and/or pneumatic or hydraulic elements for sliding the visors relative to the rods upon which they are mounted. This invention also automates the function of some visors in such a way that the motion of a visor into the appropriate position can be accmplished (a) manually, (b) by pressing conveniently located buttons connected to the car's electric system and to motors associated with the visors, and (c) by sun rays striking photcells placed at representative locations around top parts of the front windshield and the front side windows. Shades are also introduced in place of, or in conjunction with visors.

3 Claims, 1 Drawing Sheet

DUAL SUN VISORS

This is a continuation-in-part of application Ser. No. 158,846, filed 2/22/88, now abandoned.

BACKGROUND OF THE INVENTION

1. Field of the Invention

This invention relates to improvements to sun visors for passenger cars and other vehicles aimed at protecting the eyes and enhancing visibility and comfort of the driver, the front seat passenger, and also other passengers.

2. Description of the Prior Art

Current passenger cars and similar vehicles (vans, trucks, etc.) are equipped with a single sun visor on the driver side and another on the passenger side. Each visor is movable and can cover at any one time only the front windshield, or a front side window but not both. As a consequence, a problem arises when driving a winding road on some early mornings or late afternoons when the driver finds it necessary to frequently switch the position of a visor back and forth between locations along the front windshield and the front side window. The inventiors faced such a situation on several days recently when driving in Florida and other southern states. The situation was uncomfortable for two additional reasons. The inventors, like a relatively large number of drivers, set the front seat close enough to the front of the car to require the driver to move his/her head every time the visor needs to be moved from one side to the other to constantly protect the eyes and to avoid the unpleasant alternative of being frequently hit in the face. The situation even becomes dangerous in heavy fast moving traffic. There are other times when one is turning at an intersection and the change in the position of the visor can be anticipated.

For the above reasons the inventors are introducing dual visors or shades for added safety and comfort in certain situations when a driver (front seat passenger) finds it desirable to protect his eyes in advance by moving dual visors to simultaneously cover critical locations of both a side window and the front windshield.

Dual visors were introduced by others. The advantage here is the novelty of the design and the simiplicity of operation.

Additionally, the state of the art in automating various functions in a car at the touch of conveniently located buttons is presently quite advanced. One objective here is to apply this vast technology to automate the movement of sun visors or sun shades. This could be convenient when the driver finds it desirable to control the visors or shades on the front passenger's side. An advanced approach would be to install sensitive photocells at representative locations near the top corners of front windshields and front side windows. The driver could select a setting of the desired minimum light intensity which would trigger a switch to connect visor(s) motor(s) to the vehicle's electric system to automatically move the visor(s) to the proper location(s). In summary, the movement of the visors or shades may be controlled manually, at the touch of a button, or the motion can be triggered or controlled by (solar power) sun rays of a minimum driver set intensity striking photocells placed at convenient top locations of the front windshield and/or the front side windows. In either case, the driver or front seat passenger can override the automated motion and manually move the visors or shades.

SUMMARY OF THE INVENTION

This invention introduces the concept of a folding dual function or a pair, rather than a single sun visor on each of the driver and the front seat passenger sides of an automobile or a vehicle. This is in order to block sun rays coming from either the top parts of the front windshield or a front side window in situations where it is desirable too do so. Such situations may arise when turning or when driving on a winding road when the potential exists for the front windshield and a front side window to alternate being exposed to intense sun rays during relatively short time intervals. The objective is to enhance comfort of the driver (and comfort of the front seat passenger), improve visibility, and contribute to safety.

Some of the visors introduced here can be moved manually, can be moved at the touch of a conveniently located button connected to the vehicle's electric system, and the motion in the latter case can also be triggered when sun rays of a prescribed driver pre-selected intensity strike conveniently located photocells.

This invention also introduces shades, in place of one or more of the visors.

No mention is made here of the material to construct the visors or shades. It may be plastic, woodboard, metal, fabric, etc., or a combination of different materials. It is to be designed to match or contrast a vehicle's interior decoration. Exact dimensions are not mentioned, since this is a relative matter and can be varied.

BRIEF DESCRIPTION OF THE DRAWINGS

The following drawings illustrate examples of the basic shapes which are the subject of this invention. Component parts shown with the same numbering scheme in different figures are either the same or are alternative embodiments of corresponding structures.

FIGS. 4 to 24 show expanded fragmentary views of visors and possible means to show how the visors can be connected, rotated, and moved.

FIG. 4 shows a fragmentary view of visor 1, parts 12 and 11 (not normally visible) inside it, the externally visible side (the lower or bottom side) of the bracket unit 51, and the visor rods 11 and 21-22.

FIG. 5 is a view of the top side (invisible to a passenger) of the bracket 51 of FIG. 4, and shows how the visor rods 11 and 22-22 are assembled.

FIG. 6 shows a view of the visible or bottom side of an alternative arrangement of a bracket unit 52 with a wide cylindrical rod 7 holding a visor rod 11 (or alternatively holding the visor rod 21).

FIG. 7 shows a cross-sectional view of the asembly of the bracket unit 52 with the cylindrical rod 7 and the visor rod 11, and with dotted lines showing motors, axles, and gears for automating the rotations of a visor.

FIG. 8 shows a perspective expanded view of the bevel gears shown in dashed lines in FIG. 7 for rotating the visor rod 11.

FIG. 9 shows a perspective expanded view of worm gears that can be used in place of the bevel gears of FIGS. 7 and 8 for rotating the visor rod 11. In this case, the spur gear part 73 of the worm gears needs to be situated around the middle of the cylindrical rod 7, while the screw part of the worm gears needs to be situated at an appropriate distance from the axis of the wide rod 7.

FIG. 10 shows a fragmentary view of the lower part of the wide cylindrical rod 7 with a different arrangement for the bevel gears. Here the vertical part of the bevel gears is fixed to a cylindrical axle around a fixed rod. A friction gear is also fixed to the same cylindrical axle in such a way that the bevel gears cause the friction gear to rotate. The friction gear engages the cylindrical washer 61 and causes it to rotate, thereby rotating the rod 11 and the associated visor.

FIG. 11 shows a butt hinge, and indicates in dotted lines a possible motor which can be added to rotate an extended part of the pin of the hinge, thereby automating the opening and closing of the hinge (one side of the hinge is to be fixed in place to a top part of a vehicle and the other side to a visor that can be rotated).

FIG. 12 shows a pin hinge in place of the butt hinge of FIG. 11.

FIG. 13 shows a joint hinge in place of the butt hinge of FIG. 11.

FIG. 14 shows an offset blind hinge in place of the butt hinge of FIG. 11.

Note that both side plates, or one side plate of a hinge can be modified.

FIG. 15 is a perspective view of visor 1 and its possible connection above the left (the driver's) side of a windshield by joint hinge. The dashed lines indicate a possible modification of the shape of the visor to accommodate a motor 77 to automate the rotation of the visor between its normal rest or stored position and the front windshield. FIG. 15 serves as an illustration and clearly other hinges can be used in place of a joint hinge.

Figure 16:
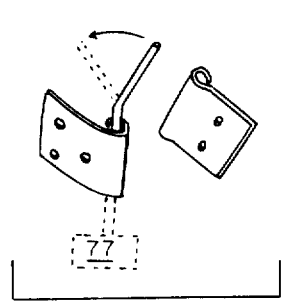
Figure 17:
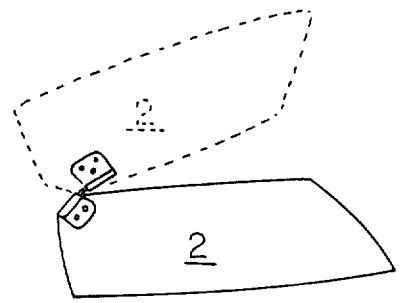

FIGS. 16 and 17 show a new design of a hinge where the pin of the hinge is bent. The two plates of this hinge shown lie essentially in the same plane in a closed position, but do not overlap in any position. FIG. 16 shows the location of the pin in the open position and shows by the arrow the direction of rotation to achieve the rest or closed position indicated by the dashed lines. Also indicated in dashed lines is a possible motor arrangement 77 for automating the rotation of the pin of the hinge, thereby automating the possible motion of a visor.

FIG. 17 shows an application of the hinge of FIG. 16 to attach a visor 2 for use to cover the top part of a side window. The visor 2 is shown in its used position in solid lines, and in its stored position in dashed lines. Note that this hinge makes it possible to eliminate the need to slide the visor in order to cover the top of the slanted side of the window adjacent to the pillar. Another advantage of the present hinge is the ability to minimize or eliminate overlap of visors in their stored or rest positions.

Figure 18:
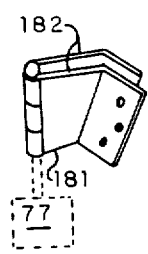
Figure 19:
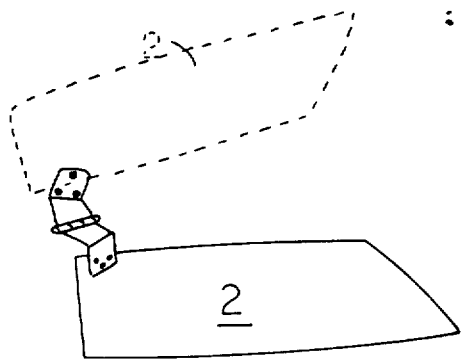

FIGS. 18 and 19 show a new design of a hinge which serves the same functions stated above in connection with FIGS. 16 and 17. The hinge here is similar to the offset blind hinge of FIG. 14, except for the fact that the faces of the plates of the hinge adjacent to the pin of the hinge are trapezoidal rather than rectangular. FIG. 18 also indicates in dashed lines a possible motor 77 for automating the possible motion.

FIG. 19 shows an application of the hinge of FIG. 17 to attach a visor 2 for use to cover the top part of a side window. The visor 2 is shown in its used position in solid lines, and in its stored position in dashed lines.

The arrangements in FIGS. 17 and 19 can also be used for visors for the front windshield.

FIGS. 20 and 21 present two other possible designs of a visor 2 for a front side window (the border of the visor shown by a dashed-dotted curved line) showing the interior of this visor. FIG. 21 indicates a possible motor 77 to control the movement of the visor. The visor can rotate around, or slide back and forth along its bar 211. Such visors may also be used for the front windshield. FIG. 21 also shows a pneumatic (or hydraulic) tube 172 for automating the backwards sliding motion of the visor.

FIGS. 22 to 24 present another possible design of a visor 1 for either or both the front windshield and a front side window. For illustration these figures show the arrangement for the front windshield 3.

FIG. 22 shows the back side of the visor 1. A plate 8 with the appropriate circular curvature is attached to the back of visor 1 by a clamp 81 attached to an anchor box 83 which serves to hold the clamp 81 in place in the interior of the car above the front windshield. The clamp 81 exerts sufficient pressure to hold the plate 8 and prevent it from sliding on its own; yet the clamp is also sufficiently loose to make it possible for the driver or front seat passenger to slide the plate 8 up or down with very little resistance. In this arrangement, the visor associated with the plate can be moved (induced to slide) up or down to a desired position.

Cross-sectional views showing possible positions of the visor relative to the front windshield 3 and the top of a car are shown in FIGS. 23 and 24. The dashed lines indicate the range for the possible motion. The small box 84 indicates the possible location of a screw which presses against an extended part of the clamp 81 and has the function of adjusting the tension on the clamp 81, tightening the clamp when turned in one direction and loosening and opening it when turned in the opposite direction, thus also allowing for release of the plate 8 and visor for possible cleaning or repair.

The plate 8 may have regularly spaced rectangular slits or holes. The anchor box 83 may be equipped with motor which can be turned on or off by a conveniently located electric switch, or by solar power. The motor has as an integral part of it a gear such as the spur gear 73 in FIG. 9 which becomes engaged with the plate 8 only when the motor is on. The gear thus can move the plate 8 of the visor 1 up and down to desired positions.

FIGS. 25 to 27 present a possible design of shades, 9 for the front windshield, and the combination 91 and 94 for a front side window. The motion of 9 and 91 can be accomplished manually and can also be automated. The motion of the part of the shade 94 follows, and is controlled by, the motion of 91.

DESCRIPTION OF THE PREFERRED EMBODIMENTS

Other objects and advantages of this invention will become more apparent from a study of the above description and from the additional material given below. The main objective of this invention is to contribute to safety and at the same time add to the comfort and convenience of a driver and passengers of an automobile or similar vehicle. This is accomplished by making it possible to simultaneously cover two parts of both a front windshield and a front side window in situations, as is discussed above, when the direction of motion is quickly changing relative to the sun's position, thus anticipating and blocking sun rays in advance from possibly hitting the driver's (front seat passenger's) eyes.

Examples of the preferred embodiments of this invention are shown in FIGS. 1 to 27 discussed above.

Figure 1:
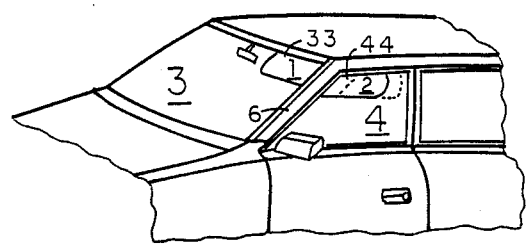
FIG. 1 is a perspective outside view of parts of a car showing dual (two, or a pair of) visors 1 and 2 in a position to provide a continuous cover over adjacent corners and top parts of a front windshield and a side window to block sun rays from hitting the driver's eyes respectively from either the front windshield 3 or a front side window 4. The dotted lines indicate that visor 2 may be movable back and forth in a horizontal direction. Possible locations of photocells are indicated as 33 near the top of the front windshield 3, and 44 near the top of a front side window 4. Dual visors are also to be installed for the front passenger side of a car.
Figure 2:
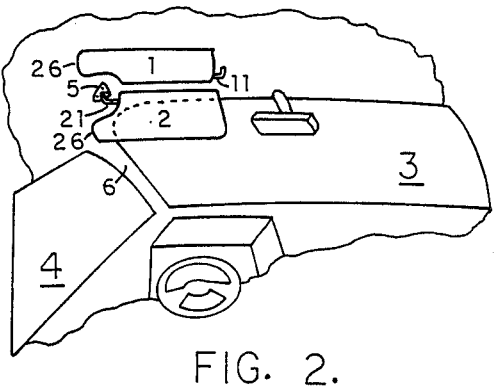
FIG. 2 is a perspective view of part of the interior of a car with dual visors 1 and 2 in one of their possible arrangements, 1 in its stored position and 2 in one of its used positions. The visors have comparable shapes and are of comparable length as is shown in this figure. The side 26 of each of the visors 1 and 2 closest to the bracket unit 5 (closest to the pillar 6 between the windshield and a side window) is curved in such a way as (a) not to interfere with the bracket unit during rotations, and yet (b) to provide a cover over a corner of the top part of a windshield during a lowered used position. The opposite side may also be curved in order not to interfere with the interior mirror when longer visors are desired.
Figure 3:
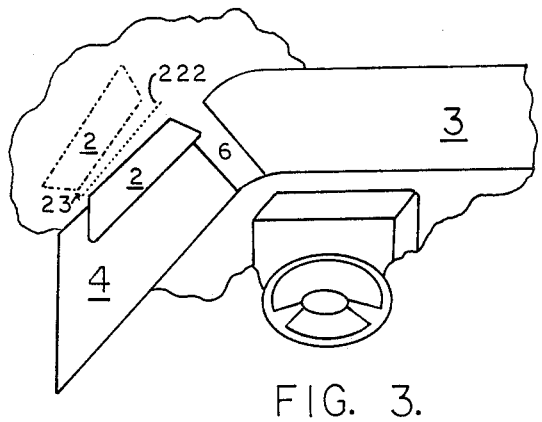
FIG. 3 is perspective view of part of the interior of a car with a different construction of a visor 2 restricted for use on a side window. The visor 2 is shown in dashed-dotted lines in its stored (raised, rest) position and in solid lines in its used (lowered) position.

A standard visor available in today's passenger cars is a variation on visor 2 shown in FIGS. 1 and 2. This visor sits and can rotate around a rod axle 21. Around rod axle 21 is a partly cylindrical clamp, such as 12 around rod 11 in FIG. 4, the cylindrical clamp being an integral fixed part of the interior of visor 2; the clamp is (a) sufficiently loose around the rod to allow rotation of the visor with little tension, yet (b) sufficiently tight to hold the visor 2 in any of its desirable positions. A screw (not shown) is sometimes used to adjust the tension (tighten or loosen) the clamp. The same descriptions (a) and (b) above also hold for the clamps 12 in FIGS. 4 and 17 in FIGS. 20 and 21 relative to their associated rod axles 11 and 211. Rod axle 21 in FIG. 4 is bent and is typically fastened to a top corner of a car's interior by a bracket unit such as 5 or 51. The visible or bottom side of 51 is shown in FIG. 4, and its opposite or hidden side is shown up-side-down in FIG. 5. The exact shape of 5 or 51 and the number of screws needed to hold it firmly in place in a car can vary and need not be as shown. The last inch or so of the bent end 22 of the rod 21 passes through the bracket unit 5 or 51, becomes wider on the visible side before the bracket unit, the function of the wider part being to prevent further movement of the rod into this unit (see also the corresponding possible arrangement in FIGS. 6 and 7 when 22 is replaced by a wider rod 7). The rod part 22 has a wide washer-like end 75 and has a spring around it between its washer-like end and the unit 5 or 51. The arrangement in 5 or 51 makes it possible to rotate the rod part 21 and its associated visor 2 in a horizontal direction. Thus, as a consequence of the ability to rotate visor 2 in a vertical direction around its rod axle 21, and the ability to rotate the rod 21 in a horizontal direction, it is possible to position visor 2 at a top part of the front windshield (see FIG. 2) or a top part of a front side window (see FIG. 1).

A standard variation on the arrangement described in the previous paragraph is to separate the horizontal part and the vertical part of the rod 21, the vertical part being the part 22 shown in FIG. 4 which passes through 51 or 5. In this case, as is indicated in FIGS. 6 and 7, the vertical part 22 of the rod in 51 is made wider and becomes the piece 7 associated with 52 of FIGS. 6 and 7. Here 52 serves the same function as 51 or 5 described above, enabling the wide rod 7 to rotate horizontally in place inside 52. FIG. 6 shows the visible or bottom part of the wide rod 7, and FIG. 7 shows a cross-sectional view with the top or hidden part of 7 as described above in connection with 22. The wide rod 7 has a variable cross section, a little wider just below the bracket unit 52 than above and inside this bracket unit. The function of the wider part of the rod 7 is to provide frictional engagement and prevent further movement of the rod into the bracket unit. A horizontal cylindrical hole is placed inside wide rod 7 which holds a cylindrical washer 61 (shown in two parts) which further holds inside it the modified end of rod 11 or 21. The modified end of rod 21 associated with the thick rod 7 is the same as is shown in the expanded view for rod 11 of FIG. 7. Here the rod has a narrow part 14 a little wider than a screw which fits adjacent to it in wide rod 7; the screw serves to fix the location of the horizontal rod 11 or 21 relative to 7 yet makes it possible to disassemble and reassemble these rods and associated visors. The purpose of the washer 61 is to hold the rod tight enough yet to make it possible for the rod 11 or 21 to rotate in place in a vertical direction. In this case the main body of the rod 11 or 21 is fixed rigidly to its associated visor 1 or 2. The visor 2 can thus be moved to positions adjacent to top parts of the front windshield or a front side window.

The previous two paragraphs dealt with features available in the prior art. The first improvement in this invention over the prior art is to make the wide bar 7 hollow inside as is shown in FIGS. 7 and 10 and to have associated with it a motor as shown in the dashed box 77 of FIG. 7. The motor would be a dual function motor having the proper combination of gears and/or belts to automate indpendent rotation of both the wide rod 7 as well as the rod axle 21 or 11. Examples of gears are spur gears, friction gears, bevel gears, and worm gears shown in the expanded views in FIGS. 7–10. The washer-like end 75 in FIG. 7 can be made into a spur gear or a friction gear and can be rotated together with the rest of the wide rod 7 by respectively an adjacent spur gear or friction gear 76 engaged with it and driven by the motor 77 as shown in the dashed lines in FIG. 7.

Possible functional gears to rotate the rod 11 or 21 are the various gears shown in FIGS. 7–10. These gears would sit inside the hollow part of the wide rod 7 and would rotate the washer 61 and the edge 13 of a visor rod 11 or 21. Rotation of the gears triggered by the motor would thus automate the movements of the associated visors. Because of the presence of the washer 61, the rod 11 or 21 can also be rotated manually by moving the visor to override the effect of the motor.

The non-friction gears shown are in the form of wheels or disks with slots, called teeth, around them. The teeth of one gear are fitted around the teeth of another so that when the gears are engaged, a rotation of one would cause the other to rotate; the gears need not all be engaged when the motor driving their motion is not turned on. Alternatively the gears could be of the friction type which do not use teeth, but instead some are shaft driven and when pressed against other friction gears cause the latter to turn.

Some of the gears would be disengaged except when the motor is running as a result of pressing a button connected to the motor by electric wires (see cable 78 in FIG. 7) which are also connected to the electric system of the vehicle, the button being placed at a convenient location. By a convenient location in this invention is meant a location on the steering wheel, the steering column, on the dashbord or on easily accessible locations on doors. Additionally, the turning on of the motor may also be triggered by solar power by sun rays hitting photocells in locations mentioned above.

The technology in the area of motor design and operation and in photocell utilization is vast and no more details need to be mentioned explicitly here. For example, a thin belt may be used inside 7 in place of the gears 73 around the washer 61; the washer would be permanent and durable and have a ring cup form close to its edge which supports and fixes the location of the belt. This technology is also to be applied in the rest of this specification without giving additional details.

The remaining preferred embodiments of this invention involve the idea of dual visors or shades to simultaneously cover adjacent top parts of the front windshield and a front side window; these embodiments are classified as (A) Rotating Sun Visors, (B) Slidable Sun Visors, (D) Sun Shades, and a combination of these.

(A) Rotating Sun Visors (i) The standard visor 2 of FIGS. 1, 2, and 4–7 available on today's automobiles and described above together with the possibility of automating its motion, is the typical rotating sun visor type where the rotations can be both in a horizontal and in a vertical direction.

(ii) An improvement to the visor recited in (i) above results when the visor 2 is designed to have three layers, the outer layers can unfold along slanted lines along its short side closest to the pillar. Once the visor 2 is placed as in FIG. 2 to cover a top part of the front windshield 3, one of its outer layers can be unfolded to cover a top part of the adjacent front side window. Likewise, once the vision 2 is placed as in FIG. 1 to cover a top part of a front side window 4, one of its outer layers can be unfolded to cover the adjacent top part of the windshield. The three layers need not be of equal length. An obvious alternative is to design the visor 2 to have only two layers.

(iii) An improvement to the construction of the visor recited in (i) above, results when the length of 22 or 7 (See FIGS. 4–7) is increased slightly to make it possible to accommodate a second visor 1 behind the visor 2 in the interior of the vehicle above the front windshield. The visor 1 is fixed rigidly to a clamp 12 which in turn sits around the visor's rod axle 11, as is shown in FIG. 4. The rod axle 11 may alternatively have the arrangement in the bracket unit 52, and in 7 as is shown iin connection with rod end 11, 14, 13, and washer 61, and gears as in FIGS. 7–10. In this case the piece 7 need not be a wide rod (may be a box or motor box) and need not rotate; only the rod 11 can rotate in place manually, and/or automatically as is described above in connection with 7. The location of 7 may be placed in this case to the right or left of visor 1.

Alternatively, the rod axle 11 may be bent at one or both ends and is to be anchored rigidly to the top interior of the vehicle adjacent to the front windshield. The anchoring of the rods 11 and 21 may be accomplished jointly as in 51 in FIG. 4, or can be done separately as is implied in connection with 5 in FIG. 2. The latter arrangement wherein the rod 11 is anchored independently from rod 21 is to be preferred for the purpose of installing a second possibly thin visor 1 behind each of the single visors available on older automobiles and vehicles. Here, the rod 11 does not move at all, but visor 1 can be rotated around rod 11 whenever visor 2 is not in the way.

A third arrangement for visor 1 is to have it attached above the front windshield by a hinge, the same type as common door hinges, butt hinges, pin hinges, joint hinges, etc., except that here the hinge should be tight enough (See description of 12 in FIG. 4 and 17 in FIGS. 20 and 21) to hold the visor 1 in any angle between the top of a vehicle and the front windshield, yet the hinge should be sufficiently loose to allow rotation of the visor to any desirable position. The motion of the visor 1 in the present case can also be automated as is done these days for doors, or similar to the manner of automating the motion of 17 of FIG. 21 described below. A preferred approach is to modify a cylindrical part of the hinge which is associated with the visor and which turns with the visor; the modification involves adding teeth to it in the form of a partial spur gear and pressing a second motor-driven gear next to it to cause it to turn when the motor is turned on, similar to the illustration for 17 in FIG. 21. Another preferred arrangement is to press a motor-driven friction gear against this cylindrical part to automate its rotation and the motion of the visor.

Another yet preferred arrangementshown in FIGS. 11–16 and 18 is to extend the pin of a hinge and to connect it to a motor 77 in a manner to automate rotation of the pin and consequently automate rotation of the associated visor.

Among the above three designs of visor 1, the hinge type designs are preferred. In either case, visor 2 can be rotated vertically and horizontally to positions along the top part of the front windshield or the top part of a front side window. Thus in most situations only visor 2 needs to be moved. In some situations when it is desirable to cover the top parts of both the front windshield and an adjacent front side window, visor 2 is moved to its position along the corner and top part of a side window and visor 1 is now free and can be rotated manually and/or automatically to cover a corner and top part of the front windshield.

(iv) Another arrangement of dual visors is to have two strictly front visors 1 each associated with one side of the top windshield 3, and to have two strictly side visors 2 (see FIGS. 3, 17, 19–24), one associated with each front side window. In this case visor 1 is the same as described above and can be rotated manually or automatically to positions such as shown in FIGS. 1 and 2. In this case visor 1 cannot be moved towards a side window, and its edge closest to be the pillar need not be curved as required in FIGS. 2, 15 and 22 to avoid interference with a bracket unit such as 5. On the other hand visor 2, shown in FIGS. 20 and 21, can rotate around its bar rod 211, and can also slide back and forth as is indicated by the dashed lines and the solid lines in connection with visor 2 in FIG. 1. The standard position of the sliding motion is the backwards position away from the front windshield, and is such that the visors do not normally touch or interfere with each other in their rest positions on top interior parts of a vehicle. The sliding motion may also be needed in order to provide a complete cover over a slanted top part of a side window adjacent to the pillar 6. The motion of visor 2 can be accomplished manually and/or can be partially or totally automated.

One main advantage of this choice of visors 1 and 2 of FIGS. 20 and 21 (which also holds for the other visors and shades discussed below) is the fact that their admissible motion is not likely to interfere with the driver's or a front seat passenger's face. In addition, the locations of visors 1 and 2 may be interchanged for an obvious equivalent design.

FIGS. 20 and 21 show two possible designs of visor 2 (the border of the visor shown by a dashed-dotted line). These figures show the interior of this visor and how this visor can rotate around, or slide back and forth along its bar rod 211. In these figures, the cylindrical parts of 171 in the interior of the visor are a little loose around the rod 211, thus allowing the visor to slide back and forth along the rod. The plate 17 sits loose and is sandwiched between two boards 172 and 173 in the interior of the visor; this plate 17 has at its end a cylindrical clamp which sits tight enough, in a central position around the rod 211, but still not too tight, in order to enable rotation of the plate 17 around the rod 211 by exerting a slight tension on the visor. The clamp part of 17 may sit around a cylindrical plate washer (as in 61 in FIG. 7) whose function is to ensure sufficient tightness but relieve friction during rotations. This arrangement results in forcing the visor and the plate 17 to rotate jointly.

The design of the visor in FIG. 21 allows for an open part around the plate 17 (see the dashed-dotted line). A motor 77 can be installed adjacent to the cylindrical part of the plate 17 in such a way as too rotate it and thereby rotate the visor 2; the motor shown can independently operate a gear engaging the cylindrical part of 17. The motor can also rotate a chain attached to a pulley shown on the bent right end of the rod 211 of FIG. 21. A point in the chain is tied to a point on the visor in order to cause the visor to move forward or backward as the chain undergoes partial rotations. When the motor is running, the spur gear shown engages teeth or slits around the cylindrical part of 17. A friction gear can also be used in place of the spur gear. In this arrangement a motor-driven friction gear presses directly against and rotates the cylindrical part of 17. The main ideas are apparent from this figure but some relative dimensions are exaggerated.

An alternative arrangement within the technology of the present state of the art is to have the motor and the plate 17 in FIG. 21 situated to the right or left of the visor in such a way that the motor controls the desired motion in a manner similar to the way a motor in some of today's cars controls the motion of a radio antenna, except that here the motor should allow for the telescoping of the rod 21 and its rotation.

In the absence of a motor, the motion of visor 2 of FIG. 21 can be partially automated by installing a pneumatic (or hydraulic) tube 172 of the same class as door closers very common on screen doors. Here the pneumatic (hydraulic) tube would again be attached firmly to 171, and would be adjacent to the rod 211. The pneumatic tube would be tightly sealed and would have a piston inside it connected to a rod which extends outside it. The outside end of the piston rod could be firmly fixed to the plate 17, and in this case a portion of the rod 211 would have a zigzag on its bottom side in order to engage an extended plate attached to the tube to prevent the clamp of 171 from sliding back along the rod 211 while the visor is in a lowered used position. The piston rod is released when the visor is raised, causing the visor to automatically slide away from the front windshield, thus preventing interference between the rest positions of adjacent visors. The orientation of the pneumatic tube in FIG. 21 (where the tube and piston rod are tied) can clearly be reversed. The pneumatic tube may be provided with a screw which adjusts piston rod speed.

Alternatively, the pneumatic (hydraulic) tube which rotates with the visor may have teeth which occupy a small strip along (but do not go all the way around) the outside of the tube. When the visor is covering a window, the teeth of the pneumatic (hydraulic) tube would become engaged with a spur gear wheel which can spin freely only in one directon. The arrangement is such that the visor 2, when covering a front window, can easily be pushed towards the front windshield and the engagement of the teeth of the pneumatic (hydraulic) tube with those of the spur gear would prevent the visor from going backwards. If however the visor is rotated partially away from a side window, the teeth of the pneumatic (hydraulic) tube would become disengaged from the teeth of the spur gear, thus freeing the movement of the piston inside the pneumatic (hydraulic) tube and automating backwards movement of the tube and its associated visor, in much the same way which results in the automatic closing of screen doors.

One of the visors shown in FIGS. 20 and i1 can be added above each front side window of older automobiles and vehicles.

(v) More interesing designs for the visor associated with a side window are those shown in FIGS. 3, and 16-19. Here, the need for the sliding motion associated with the visors of FIGS. 20 and 21 is eliminated.

FIGS. 16 and 17 show the design of a hinge where the pin of the hinge is bent. FIG. 17 shows a corner of the visor cut off and shows the slanted position of the movable part of the pin of the hinge relative to the visor. The orientation of the fixed part of the pin of the hinge is along convenient dotted line shown as 222 in FIG. 3. The degree to which the pin is bent, and the location of the line 222 determined the location of the rest position of the vissor and are appropriately left as variables to be chosen differently in accordance with differing car designs, the relative angle between the front windshield and a horizontal plane, and the desired exact locations of rest positions for the visors.

FIGS. 18 and 19 show a new design of a hinge which serves the same functions stated above in connection with FIGS. 16 and 17. The hinge here is similar to the offset blind hinge of FIG. 14, except for the fact that the faces of the plates of the hinge adjacent to the pin of the hinge are trapezoidal rather than rectangular with the side marked 181 shorter than the side marked 182 in FIG. 18. The plane faces of each plate of the hinge are bent (intersect) along a line not parallel to the pin of the hinge. The ratio of the length of 181 to the length of 182, the actual length of the various sides of the hinge, the corresponding relative orientation of the hinge to the visor, the exact location of the other fixed side of the hinge to be attached to a suitable location on top of the interior of a car adjacent to a side window, the length and width of a visor, and also the angle between the two faces of each side plate of the hinge (the degree to which each side of the hinge is bent) are appropriately left as variables. These variables are to be chosen differently in accordance with differing car designs, the relative angle between the front windshield and a horizontal plane, and the desired exact locations of rest positions for the visors.

FIGS. 16 and 18 also indicate in dashed lines possible motors 77 for automating the possible motion.

(B) Slidable Sun Visors

FIGS. 22-24 present another possible design of a visor 1 for either or both the front windshield and a front side window. For illustration the figures show the arrangement for the front windshield 3, which is very close to the arrangement for a front side window, one of the differences being the angle between a side window and the top part of a vehicle. FIG. 22 shows, in an upside down position, the side of the visor 1 which is not visible to the driver. A plate 8 with the appropriate circular curvature is attached to the back of visor 1 and is held by a clamp 81 attached to a box 83. The angle (up-side down "a") between the plate 8 and the bottom (long side) of the visor should be 90 degrees for visors for the front windshield to enable such visors to slide straight up and down, and should be selected appropriately for side windows in conformity with a car's design in order for the visor to move in a slanted up-down direction parallel to the front edge of a front side window. The box 83 is fixed in position and serves to hold the clamp 81 in place in the interior of the car above the front windshield (or above a front side window). The clamp 81 exerts sufficient pressure to hold the plate 8, but is also loose enough to make it possible for the plate 8 to slide up and down with very little resistance. In this arrangement the visor does not rotate but slides up and down to the desired position to protect the eyes of a driver or a front seat passenger from sun rays when needed. Cross-sectional views, showing possible positions of the visor relative to the front windshield 3 and the top of car are also presented in FIGS. 23 and 24. The dashed lines indicate the range for the possible motion. The box 84 indicates the possible location of a screw which presses against an extended part of the clamp 81 and has the function of adjusting the tension on the clamp 81, tightening the clamp when turned in one direction and loosening and opening the clamp 81 when turned in the opposite direction, thus releasing the plate 8 and viscor for possible cleaning or repair. The plate 8 may have regularly spaced rectangular slits or holes (the spacings and sizes of the slits or holes is to be appropriately chosen). The box 83 may be equipped with a motor which can be turned on or off by a conveniently located electric switch, or can be turned on by solar power. The motor here and in other applications in this invention would turn itself off when a visor controlled by it reaches the end of a range of its motion, or when a switch is turned off. The motor has as an integral part of it a spur gear such as 73 in FIG. 9, which becomes engaged with the plate 8 only when the motor is turned on. The gear thus can move the plate 8, and the visor 1 together with the plate, up and down to desired positions.

The design of the plate 81 and the way it can be moved is for illustration only. For example the plate may or may not have holes in it, and the desired motion can be induced by a friction type gear in place of the spur type gear. Also the plate 8 may be replaced by a curved rod with an elliptical or circular cross-section and with or without teeth or regularly spaced indentations along its side which is not visible to the driver. In order to simplify the terminology, the phrase "curved bar" will be used below to denote either a curved plate, or a curved rod.

(C) Sun Shades

The idea of sun shades in place of a visor on one or both of the front windshield and front side windows is illustrated in FIG. 25-27.

The possible design of shades 9 for the front windshield is straightforward. Here, for example, the shade has a thick border, and the lower part of the border makes it easier to move the shade up and down and prevents the shade from being drawn totally within its compartment inside the top layer of the vehicle. The left border 97 in the illustration of FIG. 25 may have an oval or circular cross-section which fits in a groove just above the windshield. This border 97 may be made of hard plastic or another durable material and its motion may be driven by contact with, and rotation of a friction gear, the gear being adjacent to said groove and being connected with a motor. There usually is enough room on top of the vehicle for the relatively small size needed for the shade to make it unnecessary to wrap the shade around a bar in its withdrawn position and thus the shade may remain relatively flat when it is withdrawn; otherwise only the bottom corner of the shade would be joined to the bottom end of 97. It would be fine for the shade 9 to more vertically up or down within a range of desirable levels. Alternatively, if it is desirable for the shade to move parallel to the windshield, then a hook or a ball extension is added to the end of 97 in such a way that the hook or ball extension can more feely in a track on the pillar which runs parallel to the edge of the windshield; the rigid part of the end of 97 and the bottom of the border around the shade serves in the present case to retain the shade 9 essentially parallel to the windshield. An alternative arrangement is to have two borders of 9, border 97 and the border parallel to it, be made of sufficiently rigid material and to be of sufficient length in the hidden compartment part of the shade so that the tendency of the borders to remain as close to straight lines as possible induces the visible part of the shade 9 to remain parallel to the front windshield.

The possible design of shades 91 and 94 for a front side window is also straightforward. Here the part 91 is made in the same way as 9 described above for the front windshield, except that here vertical motion is perfectly acceptable. The motion of 9 and 91 can be accomplished manually or via a motor, and the turning on of the motor can be induced by pressing a button or can be triggered by sun rays striking a photocell. At least part of the bottom border 92 of 91 adjacent to the shade component 94 is made of a partly curved plate in the form of a letter C turned 90 degrees counter clockwise; the plate has a smooth inside; ball bearings may also be installed inside 92 in the locations indicated by small circles in FIG. 26. The bottom part 93 of the shade 94 is partly in and fits and moves smoothly in and out of the border 92. The border 92 surrounds 93 and these borders cannot be moved up and down independently. The slanted border 95 of the shade 94 has an oval or circular cross section and its motion is guided by a groove 96 fixed above a corner of a front window. As a result of this arrangement, whenever the shade 91 moves up or down into its proper place, it automatically pulls the shade 94 along with it, the motion of the shade 94 being along a line parallel to the slanted side of a front side window. Automating the motion of the shade 91 is sufficient and serves directly to control the motion of 94. Finally, the design of the shades 91 and 94 can also be used for other windows which have composite rectangular and triangular parts.

Clearly, it is possible to have sun visors for the front windshield and shades for the front side windows, or vice versa, as well as to use different type of visors for different windows.

SCOPE OF THE INVENTION AND NOTATIONAL CLARIFICATION

The new or improved visors, shades, and their mounting systems introduced above can be applied to the windshield, the front windows, and any other windows of a vehicle, and have other potential applications. Convenient locations of the visors can be selected by car designers. The following notation is adopted in order to simplify, clarify, and distinguish different features of the various claims:

A "visor" as used in the claims shall refer to an object for shading windows of a vehicle which remains visible at all times.

In contrast, a "shade" as used in the claims shall refer to an object for shading windows of a vehicle which can be stored in a compartment when not in use and thus does not remains visible at all times.

The term "simple hinge" is used in the various claims to refer to one of the hinges shown in FIGS. 11 to 19 and described in the specification, as well as to refer to any modifications thereof that would be obvious to those skilled in the art. Some of the hinges shown are for use on a left side window, and their equivalent hinges needed for right side windows are implied and are omitted for brevity. A distinction is made between "rod mounting" as in FIGS. 1, 4–7, 10, 20 and 21, and "hinge mounting" as in FIGS. 11–19. A simple hinge is used to refer to a structure on which a door, visor, etc., can swing, comprised of (a) a pin (also referred to as a rod) which acts in part as a pivot, and (b) two plates having flat sections and having cylindrical parts surrounding the pin which act as clamps holding onto the pin. The plates have holes for mounting to objects by appropriate screws.

While we have illustrated and described several embodiments of our invention, it will be understood that these are by way of illustration only and that various changes, extensions and modifications may be contemplated in this invention and within the scope of the following claims.

We claim:

1. A sun visor for passenger cars; the visor is mounted on, and can rotate vertically with a horizontal rod axle; the end of the rod axle is surrounded by a cylindrical washer which fits sufficiently tightly and is frictionally engaged inside a cylindrical hole in a horizontal direction inside a wide vertical rod; the cylindrical washer is (a) sufficiently loose around the end of the rod axle to allow vertical rotation of the rod axle and visor with little tension, yet (b) sufficiently tight to hold the rod axle and visor in any position following partial rotations;

said wide vertical rod passes through a bracket unit fastened to a corner of a car's interior adjacent to a top corner of the front windshield; said wide vertical rod has a variable circular cross section a little wider just below the bracket unit then inside and above said bracket unit, the function of the wider part being to provide frictional engagement and prevent further movement of said wide vertical rod into the bracket unit; said wide vertical rod has yet a wider washer-like end above said bracket unit and has a spring around it between its washer-like end and the bracket unit; said wide vertical rod can be rotated horizontally in place as a result of little tension exerted on it; the arrangement makes it possible to rotate the rod axle and its associated visor in a horizontal direction;

as a consequence of the ability to rotate the visor in a vertical direction together with its rod axle and the abilitiy to rotate the rod axle together with said wide vertical rod in a horizontal direction, it is possible to position the visor at a top part of the front windshield or a top part of a front side window;

said rod axle has a narrow part near its end inside said wide vertical rod, said narrow part being a little wider than a screw which fits adjacent to it inside said wide vertical rod; the screw serves to fix the location of the rod axle relative to said wide vertical rod yet makes it possible to disassemble and reassemble the rod axle and the associated visor;

said wide vertical rod is mostly hollow inside with its said washer-like end in the form of a gear which has a motor associated with it; the motor including a combination of gears associated therewith to automate the rotation of both said wide vertical rod and said rod axle; the rotations can be conducted manually and can also be conducted automatically by (a) a motor-driven gear pressed against the outside of said washer-like end of said wide vertical rod, and (b) motor-driven gears which are associated with and can rotate the cylindrical washer surrounding the end of the rod axle inside said wide vertical rod.

2. A visor system for automobiles including two pairs of visors, one pair on the driver's side and one pair on the front seat passenger's side of the automobile, the visor system is capable in certain situations of simultaneously providing a continuous cover over adjacent corners and top parts of a front windshield and a front side window of said automobile;

the first visor of each of said two pairs of sun visor's is mounted on, and can rotate vertically through a range of unobstructed angles with a horizontal rod axle; the end of the rod axle is surrounded by a cylindrical washer which fits sufficiently tightly and is frictionally engaged inside a cylindrical hole in a horizontal direction inside a wide vertical rod; the cylindrical washer is (a) sufficiently loose around the end of the rod axle to allow vertical rotation of the rod axle and visor with little tension, yet (b) sufficiently tight to hold the rod axle and visor in any position following partial rotations;

said wide vertical rod passes through a bracket unit fastened to a corner of the automobile's interior adjacent to a top corner of the front windshield; said wide vertical rod has a variable circular cross section a little wider just below the bracket unit than inside and above said bracket unit, the function of the wider part being to provide frictional engagement and prevent further movement of said wide vertical rod into the bracket unit; said wide vertical rod has yet a wider washer-like end above said bracket unit and has a spring around it between its washer-like end and the bracket unit; said wide vertical rod can be rotated horizontally in place as a result of little tension exerted on it; the arrangement makes it possible to rotate the rod axle and its associated visor in a horizontal direction;

as a consequence of the ability to rotate the visor in a vertical direction together with its rod axle and the ability to rotate the rod axle together with said wide vertical rod in a horizontal direction, it is possible to position the visor at a top part of the front windshield or a top part of a front side window;

said rod axle has a narrow part near its end inside said wide vertical rod, said narrow part being a little wider than a screw which fits adjacent to it inside said wide vertical rod; the screw serves to fix the location of the rod axle relative to said wide vertical rod yet makes it possible to disassemble and reassemble the rod axle and the associated visor;

said wide vertical rod is mostly hollow inside with its said washer-like end in the form of a gear which has a motor associated with it; the motor including a combination of gears associated therewith to automate the rotation of both said wide vertical rod and said rod axle; the rotations can be conducted manually and can also be conducted automatically by (a) a motor driven gear pressed against the outside of said washer like end of said wide vertical rod, and (b) motor-driven gears which are associated with and can rotate the cylindrical washer surrounding the end of the rod axle inside said wide vertical rod;

the second visor of each of said two pairs of sun visors is situated normally behind said first visor and is mounted to the top of said automobile adjacent to a top part of the front windshield;

when said first visor is situated in a position to cover a corner and top part of a front side window, said second visor is free to be rotated through a range of unobstructed angles in such a way as to cover a corner and top part of the front windshield;

one side of each of said first visor and said second visor adjacent to said bracket unit and adjacent to a corner of the front windshield is curved in such a way as not to interfere with the bracket unit during rotations while being capable of providing a cover over a corner and top part of a windshield.

3. In the visor system as recited in claim 2 wherein each second visor of said two pairs of sun visors can be actuated by motor means.

* * * * *

UNITED STATES PATENT AND TRADEMARK OFFICE
CERTIFICATE OF CORRECTION

PATENT NO. : 4,919,468

DATED : Apr. 24, 1990

INVENTOR(S) : Ibrahim K. Abu-Shumays, et al

It is certified that error appears in the above-indentified patent and that said Letters Patent is hereby corrected as shown below:

The title page, should be deleted to be replaced with the attached title page.

The drawing sheets, consisting of Figs. 4 - 27, should be added as shown on the attached pages.

Signed and Sealed this

Twelfth Day of April, 1994

Attest:

BRUCE LEHMAN

*Attesting Officer*

*Commissioner of Patents and Trademarks*

United States Patent [19]

Abu-Shumays et al.

[11] Patent Number: 4,919,468

[45] Date of Patent: Apr. 24, 1990

[54] DUAL SUN VISORS

[76] Inventors: Ibrahim K. Abu-Shumays; Mary D. Abu-Shumays, both of 1248 Varner Rd., Pittsburgh, Pa. 15227

[21] Appl. No.: 387,784

[22] Filed: Aug. 1, 1989

Related U.S. Application Data

[63] Continuation-in-part of Ser. No. 158,846, Feb. 22, 1988, abandoned.

[51] Int. Cl.$^5$ .................................................. B60J 3/02
[52] U.S. Cl. .................................................. 296/97.4
[58] Field of Search ............ 296/97.4, 97.1, 97.13, 296/97.11, 97.2

[56] References Cited

U.S. PATENT DOCUMENTS

| | | | |
|---|---|---|---|
| 2,279,011 | 4/1942 | Nicholson | 296/97.4 X |
| 2,607,906 | 8/1952 | Sang | 296/97.4 |
| 2,698,728 | 1/1955 | Hedeen | 296/97.13 X |
| 2,917,186 | 12/1959 | Beets | 296/97.13 X |
| 2,976,759 | 3/1961 | Bleuer | 296/97.2 X |
| 3,017,217 | 1/1962 | Keating | 296/97.13 |
| 3,226,151 | 12/1965 | Reuther | 296/97.4 |
| 4,363,513 | 12/1982 | Sahar | 296/140 |
| 4,377,020 | 3/1983 | Vigo | 296/97.13 X |
| 4,679,843 | 7/1987 | Spykerman | 296/97.9 X |
| 4,762,359 | 8/1988 | Boerema et al. | 296/97.11 |

Primary Examiner—Margaret A. Focarino
Assistant Examiner—Joseph D. Pape

[57] ABSTRACT

A pair of sun visors for covering parts of both a front windshield and a front side window of an automobile. The visors may be attached to the automobile with cylindrical rods associated with bracket units, several different types of hinge mechanisms or a clamp and plate arrangement. The visors may also be actuated by electric motors for rotation and/or pneumatic or hydraulic elements for sliding the visors relative to the rods upon which they are mounted. This invention also automates the function of some visors in such a way that the motion of a visor into the appropriate position can be accomplished (a) manually, (b) by pressing conveniently located buttons connected to the car's electric system and to motors associated with the visors, and (c) by sun rays striking photcells placed at representative locations around top parts of the front windshield and the front side windows. Shades are also introduced in place of, or in conjunction with visors.

3 Claims, 1 Drawing Sheet

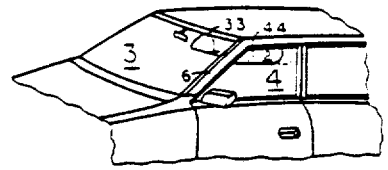

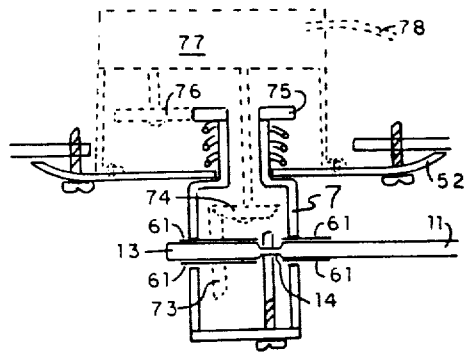

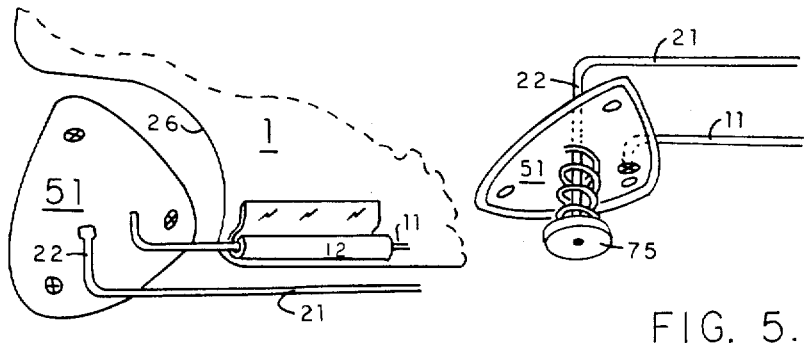
FIG. 4.
FIG. 5.
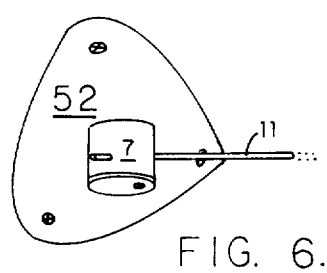
FIG. 6.
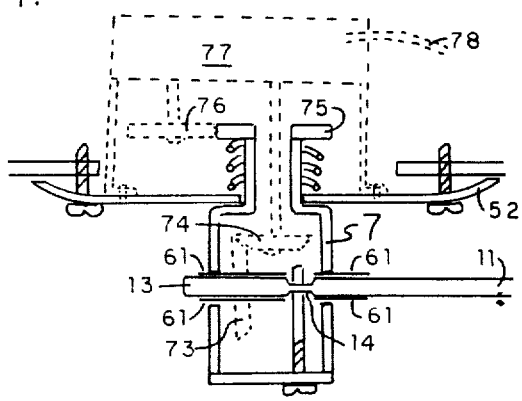
FIG. 7.
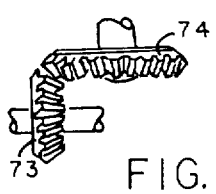
FIG. 8.
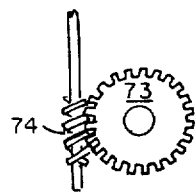
FIG. 9.

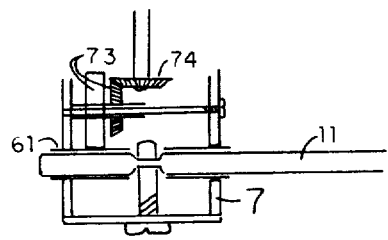 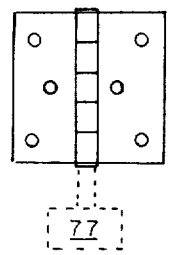
FIG. 10.   FIG. 11.
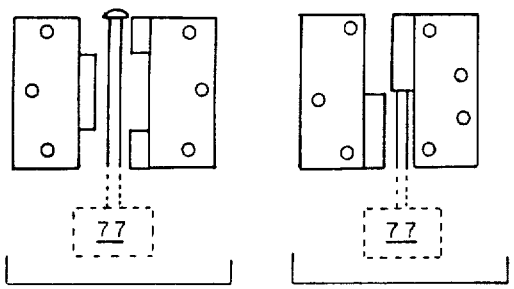 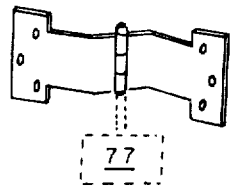
FIG. 12.   FIG. 13.   FIG. 14.
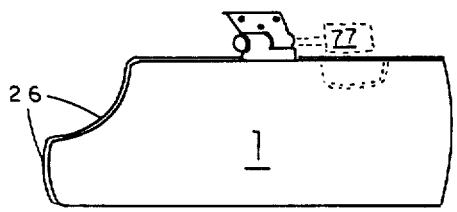
FIG. 15.

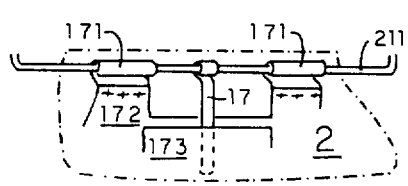 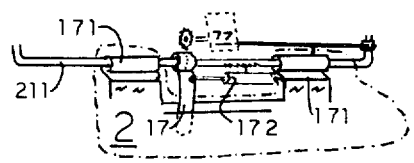
FIG. 20.  FIG. 21.
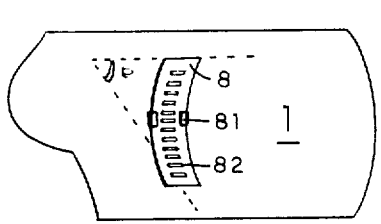 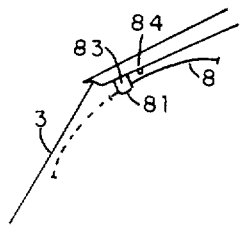 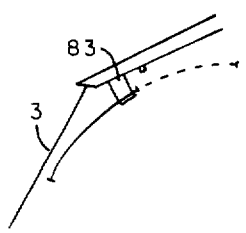
FIG. 22.  FIG. 23.  FIG. 24.
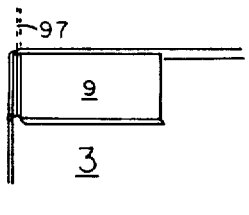 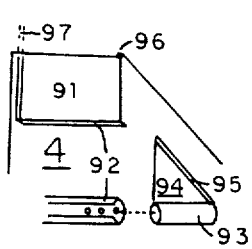 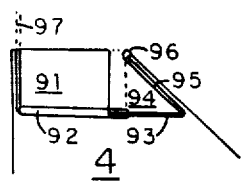
FIG. 25.  FIG. 26.  FIG. 27.